United States Patent [19]
Rothamel

[11] Patent Number: 4,984,126
[45] Date of Patent: Jan. 8, 1991

[54] METHOD AND CIRCUIT FOR STOPPING THE TEST RUN OF A ROTOR BEING BALANCED

[75] Inventor: Karl Rothamel, Darmstadt, Fed. Rep. of Germany

[73] Assignee: Hofmann Werkstatt-Technik GmbH, Pfungstadt, Fed. Rep. of Germany

[21] Appl. No.: 241,847

[22] Filed: Sep. 8, 1988

[30] Foreign Application Priority Data

Sep. 8, 1987 [DE] Fed. Rep. of Germany ....... 3730084

[51] Int. Cl.$^5$ ............................................ H01H 47/32
[52] U.S. Cl. ....................................... 361/144; 318/40; 318/436
[58] Field of Search .................. 361/143, 144; 318/40, 318/436

[56] References Cited

U.S. PATENT DOCUMENTS

| | | | |
|---|---|---|---|
| 4,360,855 | 11/1982 | Ohba | 361/153 |
| 4,480,472 | 11/1984 | Wood | 73/462 |
| 4,631,627 | 12/1986 | Morgan | 361/153 |
| 4,641,219 | 3/1987 | Aiba | 361/153 |
| 4,737,882 | 4/1988 | D'Onofrio | 361/160 |

FOREIGN PATENT DOCUMENTS 411299 3/1924 Fed. Rep. of Germany .
560168 9/1932 Fed. Rep. of Germany .

OTHER PUBLICATIONS

Simplatroll-Brake Brochure, by Lenze Antriebstechnik, Postfach 1250, D-4923 Extertal, Sitz, Printed in Germany by L/LEX/12.85, pp. 2-5 and cover.

Primary Examiner—Todd E. Deboer
Assistant Examiner—Jeffrey A. Gaffin
Attorney, Agent, or Firm—Cushman, Darby & Cushman

[57] ABSTRACT

A method and a circuit arrangement for stopping the test run of a rotor being balanced, in particular a rotor for a motor vehicle wheel. Upon the application of an armature disk of an electromagnetic brake to a friction lining, the electromagnet coil of the brake is supplied with a reduced supply current, so that a reduced braking moment by comparison with the rated braking moment is attained.

5 Claims, 1 Drawing Sheet

METHOD AND CIRCUIT FOR STOPPING THE TEST RUN OF A ROTOR BEING BALANCED

BACKGROUND OF THE INVENTION

The invention relates to a method and circuit for stopping the test run of a rotor being balanced, and more particularly to a method and circuit for stopping the test run of a rotor being balanced using an electromagnetic brake.

In conventional wheel balancing machines for measuring the imbalance of rotors, in particular in relation to motor vehicle wheels, the test run of the rotor to be balanced, is stopped with the aid of an electromagnetic brake, which is provided with a magnetic element having a potted coil. The brake also includes a friction lining secured to the magnetic element or stator and an armature element comprising an armature disk, which is subjected to a spring force so that an air gap is provided between the magnetic element and the armature element when the brake is released. The armature element is connected to that part of the machine, which must be stopped, for example a motor shaft of an electric motor for driving the primary shaft of the balancing machine. The air gap is adjusted to a rated size. When a direct current is supplied, to the magnetic element the armature element is pulled toward the friction lining of the magnetic element by the resultant magnetic field produced by the electric current. Braking is then done at the rated braking moment by means of frictional engagement of the armature disk and the friction lining. Once the voltage producing the direct current is shut off, the spring force, which is transmitted by a prestressed spring to the armature disk, retracts the armature disk to its original position. When attracting a clamping device, such as a tensioning nut, it is necessary when the rotor is clamped to the primary shaft, for the electromagnet brake to act as a holding brake, to attain satisfactory centering and a secure seat of the rotor on the primary shaft of the balancing machine. This dictates a relatively high rated braking moment, and a correspondingly high rated voltage for applying the armature disk to the friction lining. When the rated voltage is switched on in order to brake the test run, this produces an excessively high braking moment.

SUMMARY OF THE INVENTION

It is therefore the object of the invention to provide a method and a circuit arrangement in which rotation of the rotor to be balanced relative to the primary shaft of the balancing machine is prevented when the braking process is initiated.

These and other objects are achieved by a method according to the present invention, in which the intensity of the supply voltage is reduced when the armature disk is applied to the friction lining and then maintained at an intensity which overcomes the spring force, while the armature disk is applied to the friction lining, in order to attain a reduced braking moment compared with the rated braking moment. The circuit arrangement according to the invention performs this method with the aid of a monitoring circuit that processes the supply voltage of the electromagnet coil and triggers a switch connecting the electromagnet coil to the voltage supply source. When the supply voltage increase is interrupted, which occurs when the armature disk meets the friction lining, the switch turns off a first voltage supply, which was applied to the electromagnet coil upon actuation and is at least equivalent to the rated voltage, and supplies a reduced second supply voltage to the electromagnet coil, thereby producing the desired braking torque.

One advantage of the present invention is that once the braking process is initiated to stop the test run, the braking moment does not attain the level of the high rated braking moment needed when the electromagnet brake is functioning as a holding brake, for instance when the tensioning nut is being tightened. Instead, a lower braking moment is attained, which assures gentle, non-jerking braking. The electromagnet brake can be operated both at the rated braking moment, as a holding brake for tightening the tensioning nut of the clamping device, and at the substantially reduced braking moment, as a service brake for stopping the primary shaft of the balancing machine after the test run. The rated braking moment is not attained when the braking process is initiated for braking the test run, so that the aforementioned gentle braking is assured.

When the rated voltage is applied as a supply voltage to the electromagnetic coil of the electromagnetic brake, the supply current in this brake rises until the force of the spring engaging the armature disk is overcome, and the armature disk moves toward the magnetic element (stator) of the electromagnetic brake. This motion may also be an uneven one, caused by irregularities in the spring or in the magnetic field.

While the armature disk rests on the friction lining, the continuous course of the increase in the supply current in the electromagnet coil is interrupted. A supply current reduction may even briefly occur. This interruption of the supply current increase is exploited in the present invention because the supply current increase is monitored at the electromagnetic coil with the rated current supplied, and upon the interruption the supply current for the electromagnet coil is then reduced, so that only a reduced braking moment is applied. This reduced braking moment is not enough to move the armature disk through the air gap, when the armature disc is in a fully released state, counter to the spring force engaging the armature disk. However, according to the present invention, by supplying the rated voltage first as the supply current for the electromagnetic coil, the spring force engaging the armature disk can be overcome, and once the armature disk is resting on the friction lining, the braking moment can be reduced by reducing the supply current to the electromagnetic coil.

In order to attain the reduced braking torque, it is sufficient to supply current to the electromagnetic coil that attains a level equivalent to approximately two to three times the spring force engaging the armature disk. Naturally, depending on the rotor to be balanced, other reduced braking moments could also be attained by correspondingly selecting the reduced supply current.

In order to stop the test run with reduced braking moment, an electric circuit arrangement is used that has a monitoring circuit, which monitors and evaluates the supply current flowing through the electromagnetic coil with a rated voltage applied. This monitoring circuit triggers a switch so that the particular supply voltage is applied to the electromagnetic coil of the electromagnetic brake. If this monitoring circuit detects an interruption in the supply current increase, the switch is triggered, such that the initially switched-on rated voltage, or a supply voltage at a higher level than the rated voltage, is switched off. In this first phase, the armature disk is brought into contact with the friction lining, across the air gap, counter to the force of the spring. The braking moment that is then desired is established by means of a second supply voltage, which is reduced by comparison with the rated voltage and is applied to the electromagnetic coil. Depending on the supply current increase, the switch can be triggered after a delay. This assures that even if the armature disk is not guided precisely parallel across the air gap to the friction lining, the reduced supply current will not be supplied to the electromagnetic coil until the armature disk rests entirely on the friction lining. Even if the motion of the armature disk across the air gap is tilted, it is assured that the desired reduced braking moment comes into effect whenever the entire armature disk is located in the braking position, or in other words rests completely on the friction lining.

The advantages achieved by the present invention are that rotation of the wheel on the primary shaft of the balancing machine is avoided during braking of the test run and the electromagnetic brake can be used as both a holding brake and as a jerk-free service and positioning brake. Because the braking moment is constant over the rpm range, a shortened braking time and thus a shorter cycling time are attained. Actuating the holding brake, for example by a foot switch, does not cause rotation of the wheel on the primary shaft. At rotational speeds, i.e. rpm, above a threshold value, the service brake is activated first, and then, only when a reduced rpm is achieved, the holding brake is activated. The electric motor, which in conventional balancing machines is also used for braking the test run, for example by means of a pulsating direct current or by reversing the direction of rotation in the case of three-phase current, does not become heated, so that an additional fan for cooling the electric motor is unnecessary. Electric motors of a relatively low insulation class can be used. Moreover, the trigger circuit for the electromagnet brake can be equipped with semiconductors that function in the low-voltage range, which provides increased operational safety.

DESCRIPTION OF THE PREFERRED EMBODIMENT

Figure 1:
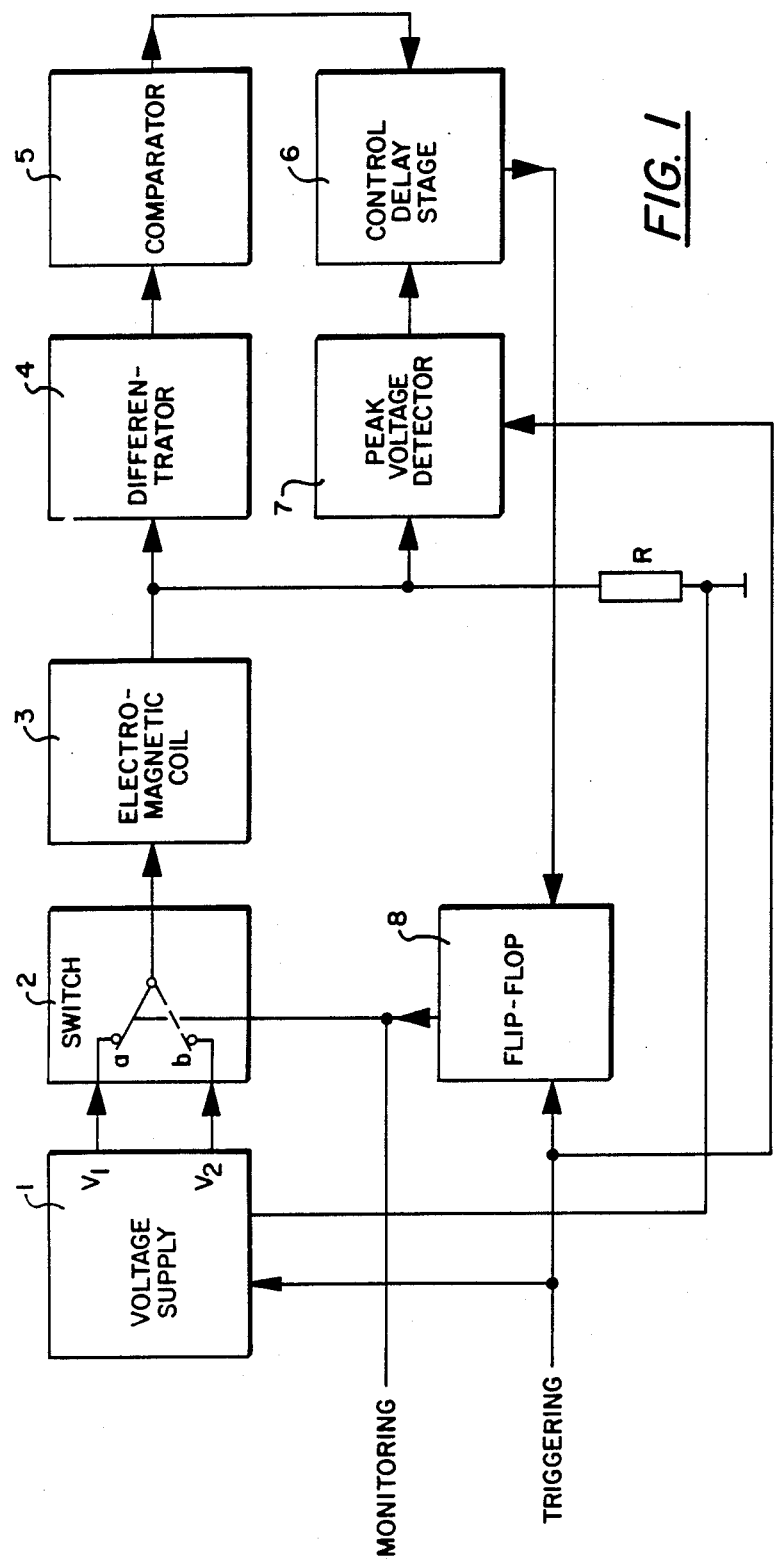
FIG. 1 is a block circuit diagram of a preferred embodiment of the circuit arrangement for triggering an electromagnetic coil of an electromagnet brake for stopping the test run of a rotor to being balanced by a balancing machine of the present invention.

In the preferred embodiment shown in FIG. 1, an electromagnetic coil 3 of an electromagnetic brake is connected via a switch 2 having two switch positions a and b to a voltage supply source 1. A resistor R is incorporated in the current circuit of the electromagnetic coil 3. The voltage at the resistor R is delivered to a differentiation circuit 4 and a peak voltage detector 7. A comparator 5 is connected to the output of the differentiation circuit 4, and a controllable delay stage 6 is connected to the output of the comparator 5. The controllable delay stage 6 is controlled by the peak voltage detector 7. The comparator 5 triggers a bistable multivibrator 8 in the form of a flip-flop via the controllable delay stage 6. The bistable multivibrator 8 triggers the switch 2. In the connecting line between the bistable multivibrator 8 and the switch 2, a monitoring circuit for monitoring the particular operating state of the brake is provided. A trigger line is provided, which is carried not only to the current supply source 1 but also to the bistable multivibrator 8 and the peak voltage detector 7 to switch on a particular operating state.

Figure 2:
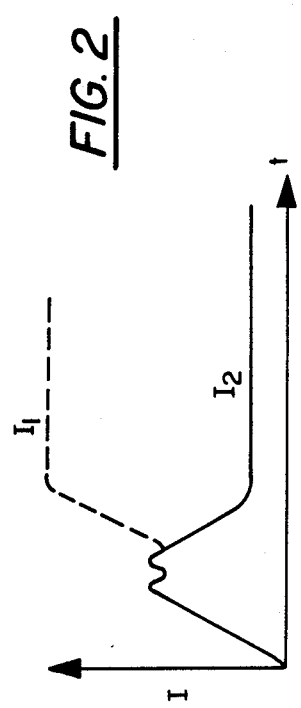
FIG. 2 is a graph depicting the course of the supply current with the rated voltage switched on and with an ensuing reduced operating voltage in the electromagnetic coil of the electromagnetic brake.

In operation, a starting pulse is supplied via the trigger line, marked "Triggering" in FIG. 1, to the voltage supply source 1 and the bistable multivibrator 8 to start the brake phase. Because of this starting pulse, the bistable multivibrator 8 assures that the switch 2 will be in position a. A supply voltage which is equivalent to or higher than the rated voltage is supplied to the electromagnetic coil 3 of the electromagnetic brake. The supply current I flowing through the electromagnetic coil 3 increases with time t, as shown in FIG. 2. During this increase, the armature disk moves across an air gap and comes to rest on the friction lining. When the armature disk is applied to the friction lining, the continuous increase of the supply current is interrupted. Should the armature disk be carried in a tilted position across the air gap, two peak points form at the location of interruption of the course of the supply current. After the second peak point has elapsed, the armature disk is completely in contact with the friction lining. If a precisely parallel guidance of the armature disk is attained, the two peak points do not appear; instead, the current course has an approximately continuous, somewhat descending phase.

If the supply voltage V1 (of rated voltage or above) were to be applied to the electromagnet coil 3, then the supply current course shown in dashed lines in FIG. 2 would result, until the rated braking moment needed if the brake is to be used as a holding brake is attained, at a current intensity I1. When braking is achieved, however, this rated braking moment is so high that it can cause rotation of the rotor clamped to the primary shaft of the balancing machine.

This is counteracted in the present invention by providing that a reduced supply voltage be applied to the electromagnetic coil 3. This is attained by monitoring the supply current of the electromagnetic coil with the aid of the voltage picked up at the resistor R. The voltage present at the resistor R is delivered to the differentiation circuit 4, which detects the interruption of the supply current increase, for example in the form of the two peak points shown in FIG. 2, and sends a corresponding signal to the comparator 5. The comparator 5 evaluates the signal emitted by the differentiation 4 and triggers the bistable multivibrator 8 in the form of a flip-flop. To assure that the bistable multivibrator 8 will not be triggered by the output signal of the comparator 5 until the armature disk rests completely on the friction lining, the controllable delay stage 6, which is set by the peak voltage detector 7, is interposed between the peak voltage detection and the bistable multivibration 8. Once this set delay period has elapsed, the bistable multivibrator 8 is actuated, for example is reset, and causes the switch 2 to return to the switch position b. As a result, the reduced supply voltage V2 (operating voltage) is then applied to the electromagnet coil 3, and an operating current I2 which brings about the desired braking moment flows in this coil. To compensate for aging of the brake components and tolerances of the brake components, the magnitude of the supply voltage V2 may be variable. A digital-analog converter, not shown in further detail, may for instance be used to this end. In this way, the desired braking moment for the service brake function of the electromagnetic brake is always attainable.

While the invention has been described in what is presently considered to be a preferred embodiment, it is to be understood that the invention is not limited to the disclosed embodiment but, on the contrary is intended to cover modifications and equivalent arrangements included within the spirit and scope of the appended claims.

What is claimed is:

1. An apparatus for moving a movable member, biased by a biasing force in a first position, to a second position comprising:

an electromagnetic coil for producing a force on said movable member in opposition to said biasing force, in response to the application of an electric voltage on said electromagnet coil;

voltage supplying means for applying a first electric voltage to cause a time-increasing current flow in said electromagnet coil so that said movable member is moved against said biasing force to said second position and for applying a second electric voltage to said electromagnetic coil, less than said first electric voltage, to maintain said movable member in said second position;

control means for causing said voltage supplying means supply said first voltage when said movable member is in said first position and said second voltage when said movable member is in said second position;

switch means for connecting said electromagnetic coil to one of said supplying means first electric voltage and said supplying means second electric voltage;

a flip-flop electrically connected to said switch means, said flip-flop transmitting an electric signal to said switch means thereby causing said switch means to connect said electromagnetic coil to one of said supply means first electric voltage and said supply means second electric voltage;

a differentiation circuit electrically connected to said electromagnetic coil for detecting an interruption in the increase in the time-increasing current and generating a signal in response thereto; and a comparator electrically connected between said differentiation circuit and said flip-flop for causing said flip-flop to change from a state wherein said switch means connects said electromagnetic coil to said supplying means first electric voltage to a state wherein said switch means connects said electromagnetic coil to said supplying means second electric voltage in response to said signal generated by said differentiation circuit.

2. An apparatus as in claim 1 further comprising a delay means electrically connected between said comparator and said flip-flop for transmitting a delay signal to said flip-flop thereby causing said electromagnetic coil to be connected to said supplying means first electric voltage for a predetermined time period.

3. An apparatus for moving an armature disk, which is biased, by a biasing force, in a first position to a second position comprising:

an electromagnetic coil for producing a force on said armature disk in opposition to said biasing force in response to the application of a voltage to said electromagnetic coil;

a voltage supplying means for supplying a first voltage sufficient to cause a time-increasing current flow in said electromagnetic coil to produce a first force sufficient to move said armature disk against said biasing force from said first position to said second position and for supplying a second voltage sufficient to cause said electromagnetic coil to produce a second force, less than said first force, for maintaining said armature disk in said second position;

control means for causing said voltage supply means to generate said first voltage when said armature disk is in said first position and said second voltage when said armature disk is in said second position;

switch means for connecting said electromagnetic coil to said first voltage supply or said second voltage supply;

a flip-flop electrically connected to said switch means for transmitting an electric signal to said switch means, thereby causing said switch means to connect said electromagnetic coil to one of said first voltage supply and said second voltage supply;

a differentiation circuit electrically connected to said electromagnetic coil for detecting an interruption in the increase in the time-increasing current and generating a signal associated therewith; and a comparator electrically connected between said differentiation circuit and said flip-flop for causing said flip-flop to change from a state wherein said switch means connects said electromagnetic coil to said first voltage supply to a state wherein said switch means connected to said electromagnetic coil to said second voltage in response to said signal generated by said differentiation circuit.

4. An apparatus as in claim 3 further comprising a delay means electrically connected between said comparator and said flip-flop for transmitting a delay signal to said flip-flop, thereby causing said electromagnetic coil to be connected to said supplying means first electric voltage for a predetermined time period.

5. A method of moving a movable member biased in a first position by a biasing force to a second position comprising the steps of:

applying a first voltage to an electromagnetic coil, thereby producing a time-increasing current in said electromagnetic coil and a first force on said movable member in opposition to said biasing force so that said movable member is moved from said first position to said second position; and applying a second voltage to said electromagnetic coil, thereby producing a second force on said movable member, less than said first force, in opposition to said biasing force so that said movable member is maintained in said second position, wherein said second voltage applying step is performed in response to detecting an interruption in said time-increasing current produced in said electromagnetic coil.

* * * * *